(12) United States Patent
Park et al.

(10) Patent No.: US 11,746,394 B2
(45) Date of Patent: Sep. 5, 2023

(54) METHOD FOR MANUFACTURING A TRUNNION FOR A CONSTANT VELOCITY JOINT, A TRUNNION MANUFACTURED THEREBY, AND A HEAT TREATMENT DEVICE OF THE TRUNNION

(71) Applicants: HYUNDAI MOTOR COMPANY, Seoul (KR); KIA CORPORATION, Seoul (KR); SEOHAN INDUSTRY CO., LTD., Deoksan-eup (KR); KOREA FLANGE CO., LTD, Ulsan (KR)

(72) Inventors: Jeong Lyul Park, Hwaseong-si (KR); Wonkew Ban, Hwaseong-si (KR); Hyun Ho Yim, Hwaseong-si (KR); Chang-Gu Lee, Hwaseong-si (KR); Min-Gyu Kim, Suwon-si (KR)

(73) Assignees: HYUNDAI MOTOR COMPANY, Seoul (KR); KIA CORPORATION, Seoul (KR); SEOHAN INDUSTRY CO., LTD., Deoksan-eup (KR); KOREA FLANGE CO., LTD, Ulsan (KR)

(*) Notice: Subject to any disclaimer, the term of this patent is extended or adjusted under 35 U.S.C. 154(b) by 95 days.

(21) Appl. No.: 17/493,484

(22) Filed: Oct. 4, 2021

(65) Prior Publication Data
US 2022/0106660 A1    Apr. 7, 2022

(30) Foreign Application Priority Data
Oct. 6, 2020    (KR) .......................... 10-2020-0128713

(51) Int. Cl.
*C21D 9/40*    (2006.01)
*C21D 1/42*    (2006.01)
(Continued)

(52) U.S. Cl.
CPC ................ *C21D 9/40* (2013.01); *C21D 1/18* (2013.01); *C21D 1/42* (2013.01); *C21D 9/0062* (2013.01); *F16D 3/2055* (2013.01)

(58) Field of Classification Search
None
See application file for complete search history.

(56) References Cited

U.S. PATENT DOCUMENTS

| 8,454,767 B2 | 6/2013 | Itagaki et al. |
| 8,506,202 B2 | 8/2013 | Nakagawa et al. |

(Continued)

FOREIGN PATENT DOCUMENTS

| JP | H08327303 A | 12/1996 |
| JP | 2000087134 A | 3/2000 |

(Continued)

OTHER PUBLICATIONS

Machine Translation of JP-2019143216-A (Year: 2019).*
Machine Translation of KR20170121791A (Year: 2017).*
Machine Translation of KR20170115143A (Year: 2017).*

*Primary Examiner* — Kevin E Yoon
*Assistant Examiner* — Ryan L Heckman
(74) *Attorney, Agent, or Firm* — Lempia Summerfield Katz LLC

(57) ABSTRACT

A method for manufacturing a trunnion for a constant velocity joint, the trunnion having a plurality of journal units provided outside around a hub unit, the method including a first step of manufacturing the trunnion, a second step of thermally treating a rounded outer circumferential surface of the journal unit, and a third step of thermally treating a connection unit disposed between the journal unit and the hub unit and having a diameter smaller than that of the journal unit.

9 Claims, 14 Drawing Sheets

(51) Int. Cl.
  *F16D 3/205* (2006.01)
  *C21D 1/18* (2006.01)
  *C21D 9/00* (2006.01)

(56) References Cited

U.S. PATENT DOCUMENTS

| | | | |
|---|---|---|---|
| 8,821,652 B2 | 9/2014 | Kozawa et al. | |
| 10,738,832 B2 | 8/2020 | Lee | |
| 2005/0039829 A1* | 2/2005 | Christofis | F16D 3/2055 |
| | | | 148/567 |
| 2012/0222779 A1 | 9/2012 | Itagaki et al. | |
| 2017/0284476 A1 | 10/2017 | Lee | |
| 2019/0101165 A1* | 4/2019 | Yamazaki | C23C 8/22 |

FOREIGN PATENT DOCUMENTS

| | | | | |
|---|---|---|---|---|
| JP | 2008064158 A | | 3/2008 | |
| JP | 2012180930 A | | 9/2012 | |
| JP | 2016056825 A | | 4/2016 | |
| JP | 6026096 B2 | | 10/2016 | |
| JP | 2019143216 A | * | 8/2019 | ............. C21D 9/00 |
| JP | 2019143216 A | | 8/2019 | |
| JP | 2020020402 A | | 2/2020 | |
| KR | 20170121791 A | * | 4/2016 | ............. C21D 9/00 |
| KR | 20170121791 A | | 11/2017 | |
| KR | 101836610 B1 | | 4/2018 | |
| KR | 20170115143 A | * | 4/2018 | ............. C21D 9/00 |

\* cited by examiner

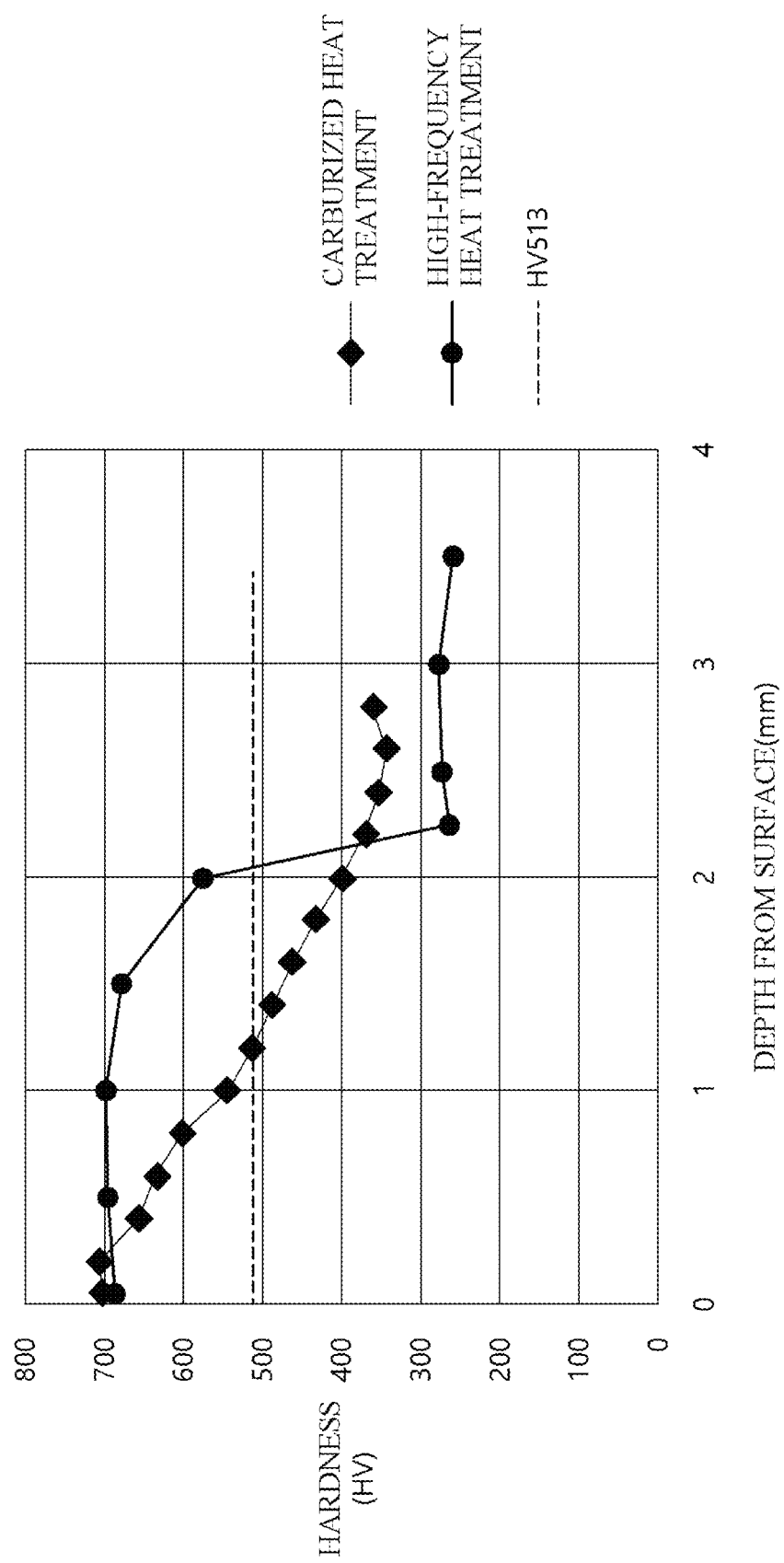

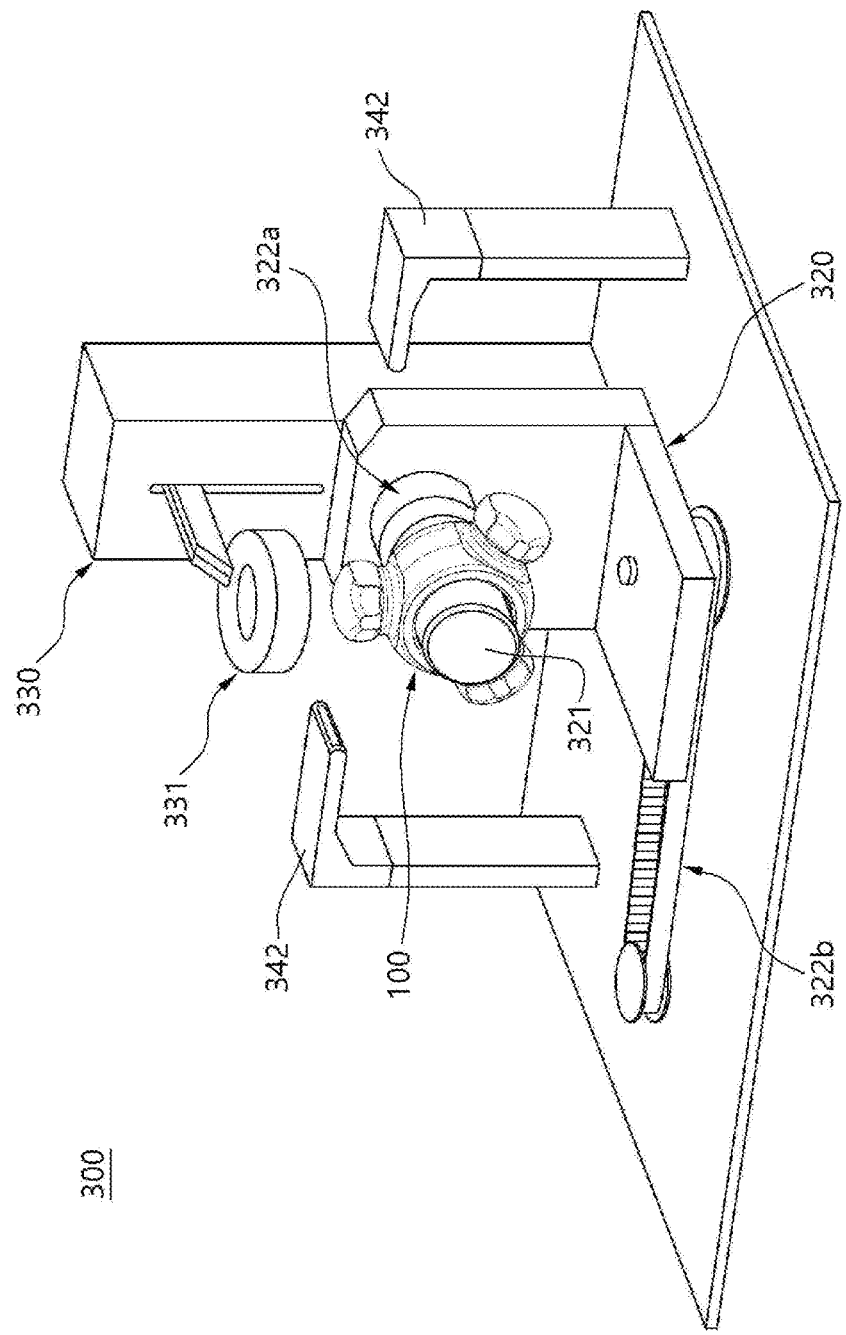

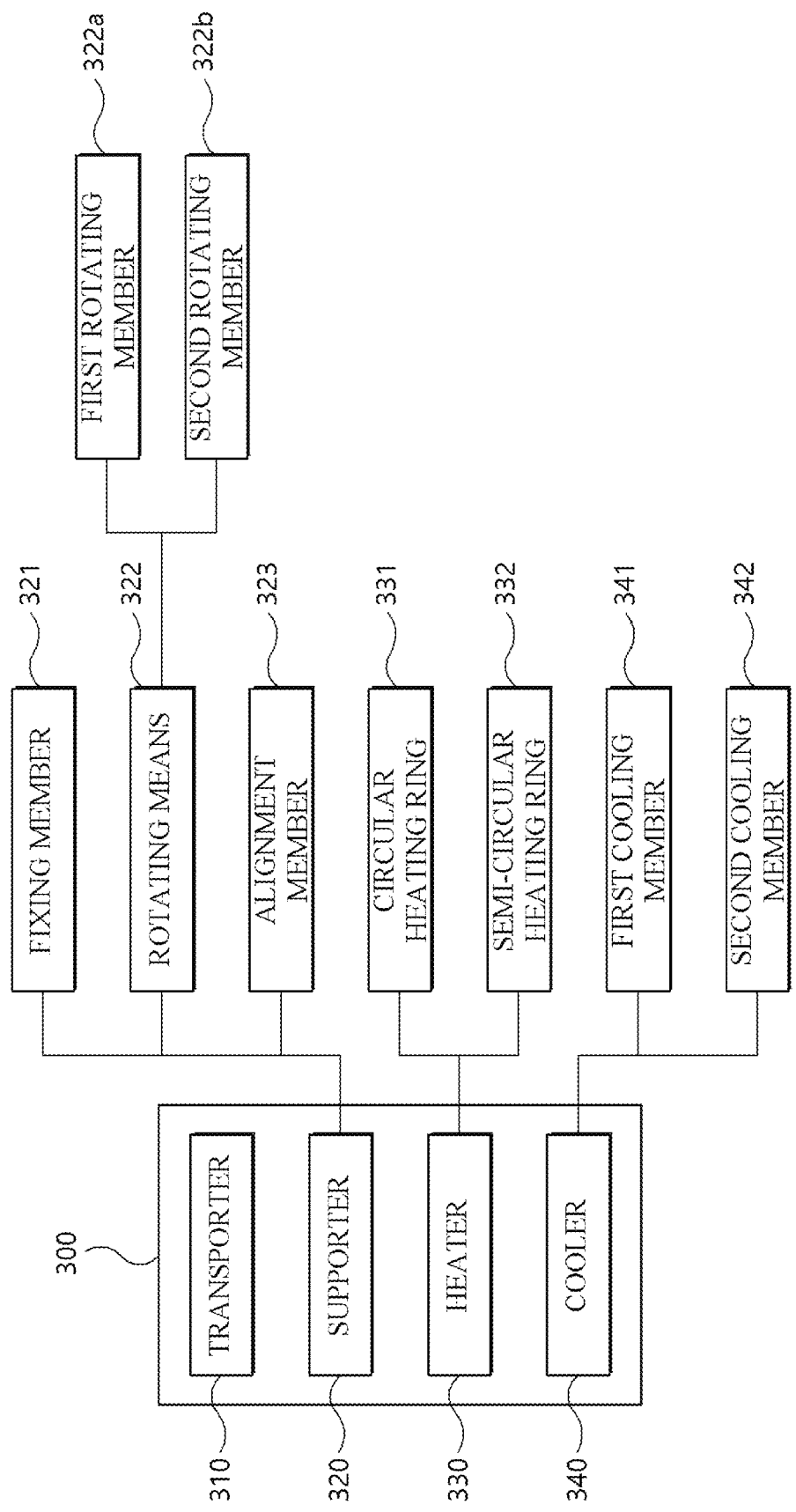

METHOD FOR MANUFACTURING A TRUNNION FOR A CONSTANT VELOCITY JOINT, A TRUNNION MANUFACTURED THEREBY, AND A HEAT TREATMENT DEVICE OF THE TRUNNION

CROSS-REFERENCE TO RELATED APPLICATION

This application claims priority to Korean Patent Application No. 10-2020-0128713, filed on Oct. 6, 2020, which is incorporated herein by reference in its entirety.

BACKGROUND OF THE DISCLOSURE

Field of the Disclosure

The present disclosure relates to a method for manufacturing a trunnion for a constant velocity joint, a trunnion manufactured thereby, and a heat treatment device of the trunnion, and more specifically, to the method, the trunnion, and the heat treatment device, which improve a heat treatment process of a trunnion.

Description of Related Art

Generally, as shown in FIG. 1, a tripod constant velocity joint 10 is composed of a housing 1 integrally connected to a driving shaft 3, a trunnion 110 inserted into a track 2 formed in the housing 1 and spline-coupled to a driven shaft to deliver power, and a roller assembly 200 inserted into three journal units 120 of the trunnion to absorb a relative motion that occurs between the track 2 of the housing 1 and the journal unit 120 of the trunnion 110.

If the driving shaft 3 and driven shaft of the tripod constant velocity joint are coupled to be bent with each other, the relative motion occurs between the track 2 of the housing 1, the trunnion 110, and the roller assembly 200. The frictional force formed by the relative motion generates an axial force in an axial direction of the driven shaft. The axial force has the maximum value of three times for each rotation of the constant velocity joint.

The friction generated by the relative motion between the trunnion and the roller assembly can cause abrasion of the journal unit of the trunnion A driving force delivered from the driving shaft can cause deformation or damage of the trunnion.

The axial force generated is larger if a load acting on the constant velocity joint is large or a joint angle is large, such as when a vehicle suddenly starts, causing lateral vibration of the vehicle.

Therefore, to compensate for the abrasion of the journal unit and the deformation or damage of the trunnion, it is possible to store a plurality of trunnions in one chamber after forging and turning the trunnion made of the low-carbon alloy steel. Abrasion resistance performance and strength are thereby improved through a carburized heat treatment process.

However, the trunnion 110 subjected to the carburized heat treatment process has a problem in that the clearance amount is increased or that assembly is not possible when the trunnion 110 is assembled to the driven shaft due to thermal deformation of an inner diameter spline and deviations in deformation amounts between material lots.

Further, the inner diameter spline of the trunnion is manufactured by a broaching process before heat treatment. Various types and sizes of broaching tools are required in preparation for the thermal deformation deviation.

The contents described in Description of Related Art are to help understand the background of the present disclosure and may include what is not previously known to those having ordinary skill in the art to which the present disclosure pertains.

SUMMARY OF THE DISCLOSURE

An object of the present disclosure is to solve the above problems, and more specifically, to provide a method for manufacturing a trunnion for a constant velocity joint, the trunnion manufactured thereby, and a heat treatment device of the trunnion, which can improve a heat treatment process. The heat treatment process thermally treats a journal unit partially through high-frequency induction heating of a trunnion, thereby selectively performing the heat treatment only for a portion that requires abrasion resistance and strength performance in a component. The heat treatment process avoids the heat treatment for an unnecessary portion of the component to prevent thermal deformation.

Further, another object of the present disclosure is to provide a method for manufacturing a trunnion for a constant velocity joint, the trunnion manufactured thereby, and a heat treatment device of the trunnion, which can manufacture the constant velocity joint with a medium carbon alloy steel, thereby solving the inconvenience of having to include a carburized heat treatment process after manufacturing the constant velocity joint with a low-carbon alloy steel.

The present disclosure for achieving the objects provides a method for manufacturing a trunnion for a constant velocity joint, the trunnion having a plurality of journal units provided on the outside thereof around a hub unit. The method includes: a first step of manufacturing the trunnion; a second step of thermally treating a rounded outer circumferential surface of the journal unit; and a third step of thermally treating a connection unit disposed between the journal unit and the hub unit and having a diameter smaller than that of the journal unit.

The second step or the third step can carry out heat treatment up to a depth from 5.0 to 8.0 millimeters (mm) from outer surfaces of the journal unit and the connection unit except for a region of a spline provided on an inner circumferential surface of the hub unit.

The region subjected to heat treatment through the second step or the third step can maintain hardness HV560 or more up to the depth of at least 2 mm from the outer surfaces of the journal unit and the connection unit.

The second step or the third step can include: through a high-frequency induction heating device, a heating step of carrying out heating for 1.5 to 2.8 seconds with an output from 64 to 68 kilowatts (KW); a delaying step having a time difference from 0.05 to 0.15 seconds; and a cooling step of carrying out cooling for 4.5 to 5.5 seconds.

The second step or the third step can have the following conditions: an input current is from 150 to 159 amperes (A), a positive voltage is from 5.6 to 6.2 kilovolts (KV), and a positive current is from 4.5 to 5.0 A.

The second step or the third step can include a tampering step of carrying out tampering at a temperature from 150 to 170° C. for 100 to 140 minutes.

When the second step and the third step are done, the outer hardness of the journal unit and the connection unit can be formed from HRC58 to 63.

The first step can have the trunnion made of a medium carbon steel (S50C to S55C) containing carbon of 0.2 to 0.5 wt % based on the total weight, and the trunnion can include carbon (C): 0.47 to 0.58 wt %, silicon (Si): 0.15 to 0.35 wt %, manganese (Mn): 0.60 to 0.90 wt %, phosphorus (P): 0.030 wt % or less (more than 0), and sulfur (S): 0.035 wt % or less (more than 0).

The first step can add at least one of Mn, chromium (Cr), nickel (Ni), molybdenum (Mo), and/or boron (B) alloy elements to the trunnion.

The method for manufacturing the trunnion for the constant velocity joint can further include a fourth step of rotating the hub unit at a set angle to thermally treat the other journal unit when the heat treatment (the second step or the third step) for one journal unit is done.

Further, the present disclosure provides a trunnion manufactured by the method for manufacturing a constant velocity joint.

Further, the present disclosure provides a heat treatment device of a trunnion including: a transporter configured to supply and eject a trunnion; a supporter configured to receive and latch the trunnion from the transporter; a heater of a high-frequency induction heating method configured to heat a journal unit or a connection unit of the trunnion mounted on the supporter; and a cooler configured to cool a region heated by the heater.

The supporter can include: a fixing member inserted into the center of a hub unit of the trunnion to fix the trunnion; a rotating means configured to rotate the fixing member or the supporter at a set angle; and an alignment member configured to control a mounted direction or angle of the trunnion.

The heater can include a circular heating ring configured to heat an outer surface of the journal unit and a semicircular heating ring configured to heat an outer surface of the connection unit.

The cooler can include a first cooling member configured to cool the trunnion and a second cooling member configured to cool the heater.

The heater can carry out heat treatment up to a depth from 5.0 to 8.0 millimeters (mm) from the outer surfaces of the journal unit and the connection unit except for a region of a spline provided on an inner circumferential surface of the hub unit.

The rotating means can include: a first rotating member configured to rotate the journal unit of the other side of the trunnion to be placed at a heating location of the heater after the journal unit of one side of the trunnion mounted on the fixing member is heated or cooled; and a second rotating member configured to rotate the supporter using the center of the journal unit as the rotating axis in the heating process of the heater.

The method for manufacturing the trunnion for the constant velocity joint, the trunnion manufactured thereby, and the heat treatment device of the trunnion according to the embodiments disclosed herein can have the following operations and effects.

First, it is possible to thermally treat only a portion of the journal unit of the trunnion, thereby preventing deformation caused by the heat treatment for the portion where heat treatment is unnecessary, such as the spline. Second, it is possible to prevent thermal deformation caused by the heat treatment of the spline preventing lash due to the clearance between the spline and the driven shaft and to prevent the damage and assembly error or failure of the trunnion due to the excessive press-fitting, thereby solving the quality problem.

Third, it is possible to simplify the broaching tool for manufacturing the shape of the spline due to the absence of thermal deformation caused by heat treatment and to reduce the preceding process, thereby saving the manufacturing cost.

Fourth, it is possible to thermally treat the upper end of the journal unit or the connection unit of the journal unit adjacent to the rotating ring unit simultaneously or selectively depending upon the shape of the journal unit of the trunnion.

Fifth, it is possible to perform the heat treatment through the high-frequency induction heating unlike the carburized heat treatment process. Hardness is thereby constant and maintained up to the setting section (depth). Reduction in hardness or abrasion resistance due to the surface processing is also prevented even if the post-treatment processing is needed.

Sixth, it is possible to significantly reduce the failure rate through the individual product inspection or the pre-inspection for each trunnion after the heat treatment through the high-frequency induction heating. This prevents having to completely dispose of a large number of products when failure occurs in the carburized heat treatment process.

BRIEF DESCRIPTION OF THE DRAWINGS

FIG. 9 is a graph showing hardness (Vickers Hardness, HV) by depth from the surface in the method for manufacturing the trunnion for the constant velocity joint shown in FIG. 7 compared to the conventional heat treatment method through the carburized heat treatment.

FIG. 10 is a perspective diagram schematically showing a heat treatment device of the trunnion according to the present disclosure.

FIG. 13 is a block diagram showing a configuration of the heat treatment device of the trunnion according to the present disclosure.

DESCRIPTION OF SPECIFIC EMBODIMENTS

Figure 1:
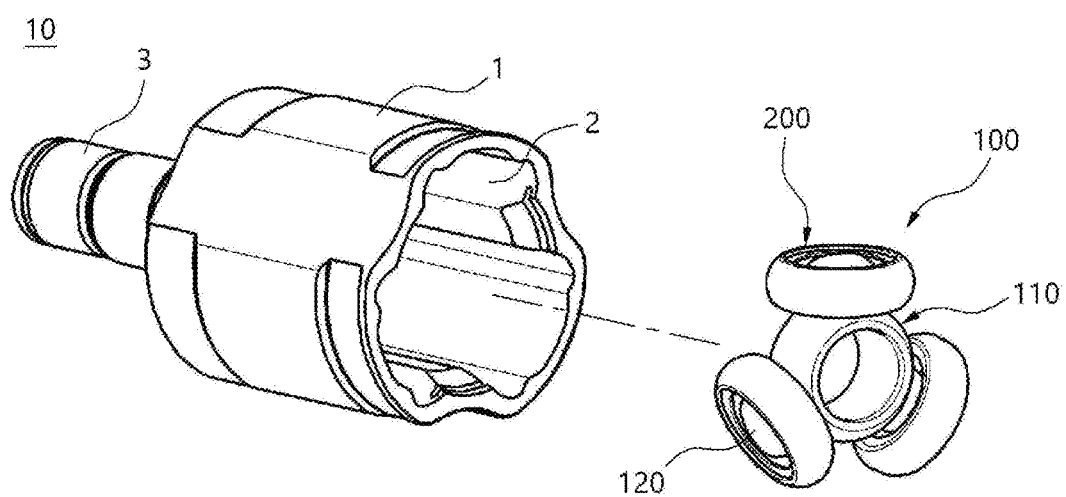
FIG. 1 is an exploded perspective diagram showing a constant velocity joint according to an embodiment of the present disclosure.

Since the present disclosure can have various changes and can have various embodiments, specific embodiments are shown in the drawings and described.

However, this is not intended to limit the present disclosure to the specific embodiments disclosed herein. It should be understood that the present disclosure includes all modifications, equivalents, and substitutes included in the spirit and technical scope of the present disclosure.

Terms including an ordinal number such as first or second can be used to describe various components, but the components are not limited to the terms.

The terms are used only for the purpose of distinguishing one component from another component.

For example, without departing from the scope of the present disclosure, a second component can be referred to as a first component, and similarly, the first component may also be referred to as the second component.

The term and/or includes a combination of a plurality of related listed items or any of a plurality of related listed items.

It should be understood that when a component is referred to as being "connected" or "coupled" to another component, it can be directly connected or coupled to another component, but other components can also exist therebetween.

On the other hand, when a component is referred to as being "directly connected" or "directly coupled" to another component, it should be understood that there is no other components therebetween.

The terms used in the present application are only used to describe specific embodiments and are not intended to limit the present disclosure. When a component, device, element, or the like of the present disclosure is described as having a purpose or performing an operation, function, or the like, the component, device, or element should be considered herein as being "configured to" meet that purpose or to perform that operation or function.

The singular expression includes the plural expression unless the context clearly states otherwise.

In the present application, it should be understood that terms such as "comprise" or "have" are intended to designate that a feature, number, step, operation, component, part, or combination thereof described in the specification exists. However, the possibility of the existence or addition of the one or more other features or numbers, steps, operations, components, parts, or combinations thereof is not excluded.

Hereinafter, the embodiments of the present disclosure are described in detail with reference to the accompanying drawings. The same or corresponding components are denoted by the same reference numerals. Regardless of reference numerals redundant description of components is omitted.

Hereinafter, a structure of a trunnion for a constant velocity joint according to an embodiment of the present disclosure is first described with reference to the drawings.

Figure 2:
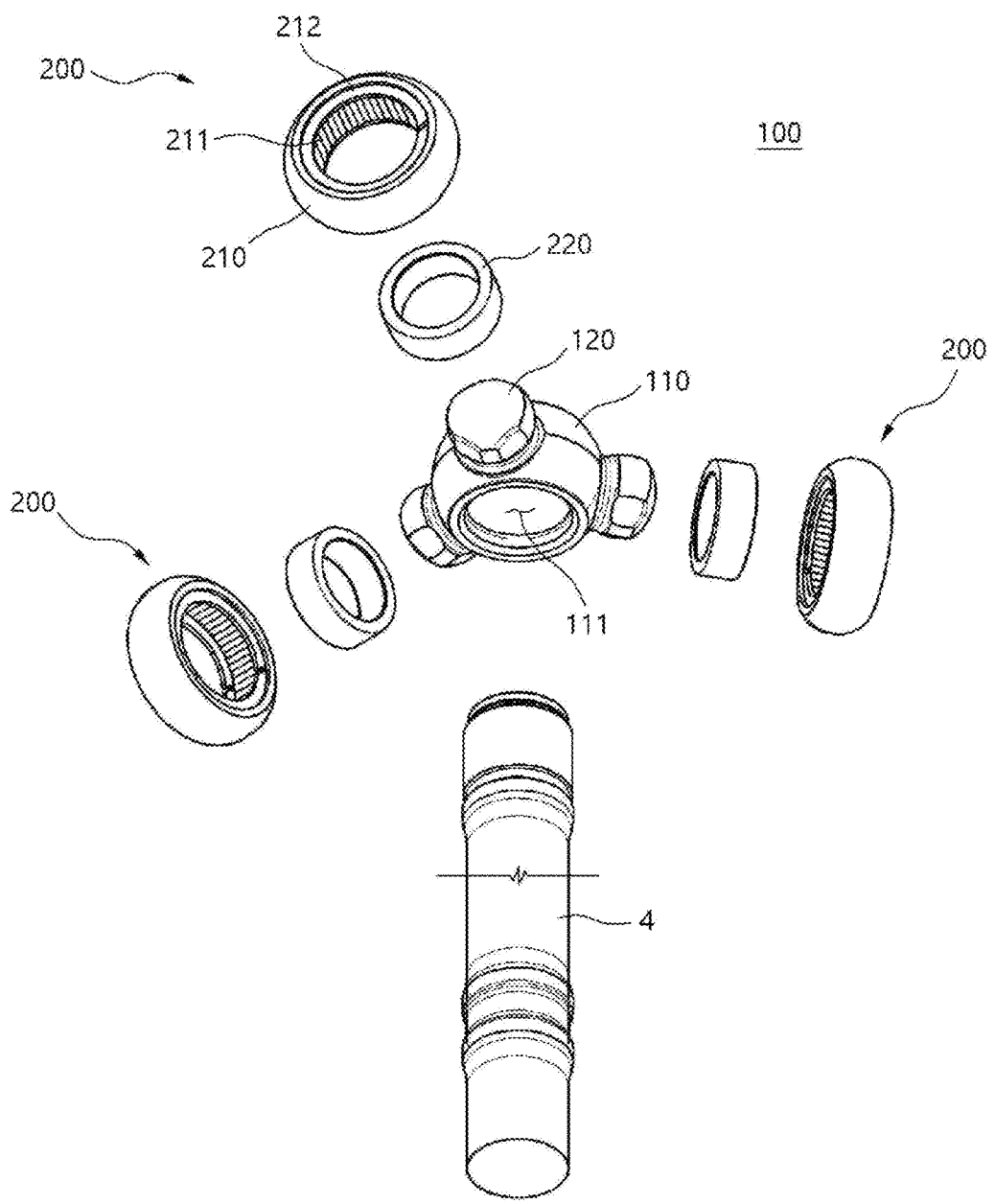
FIG. 2 is an exploded perspective diagram showing a trunnion for the constant velocity joint shown in FIG. 1.
Figure 3:
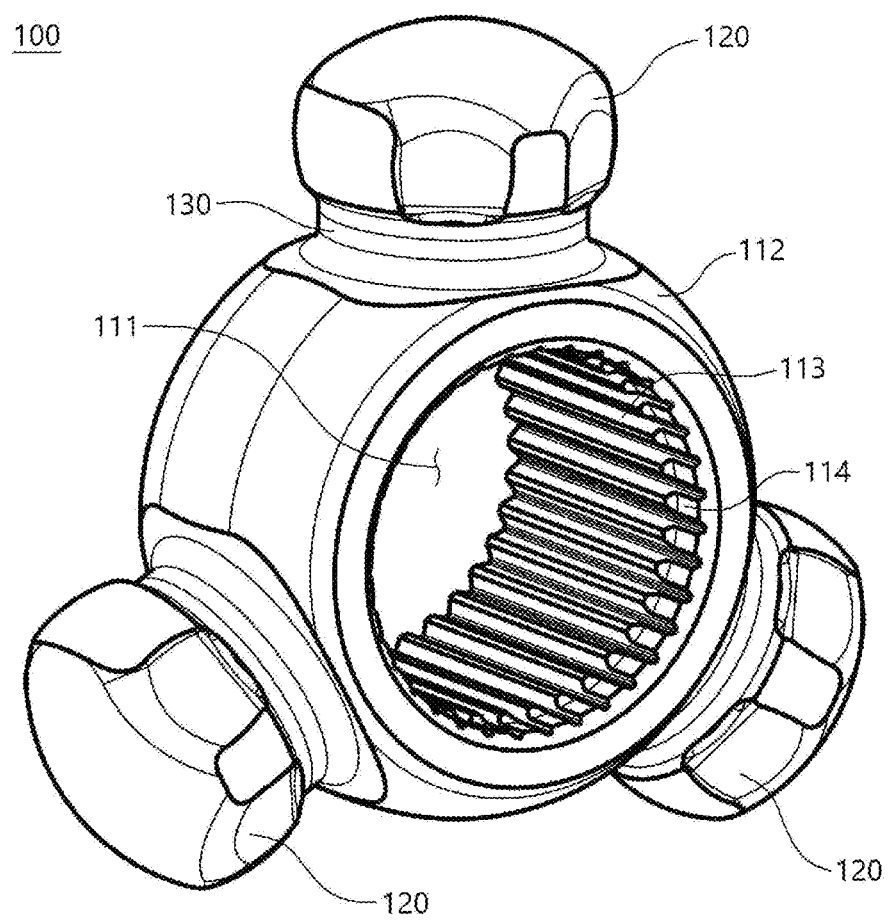
FIG. 3 is a perspective diagram showing an enlarged view of the trunnion for the constant velocity joint shown in FIG. 1.
Figure 4:
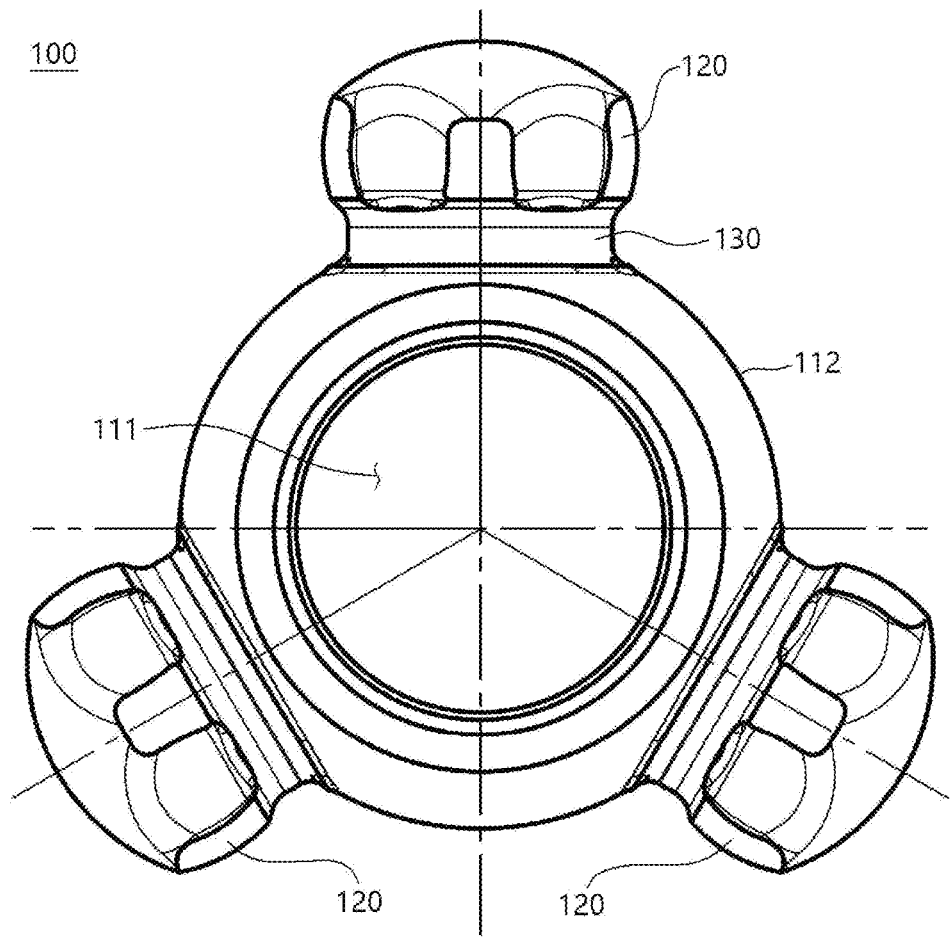
FIG. 4 is a front diagram showing a front of the trunnion shown in FIG. 3.
Figure 5:
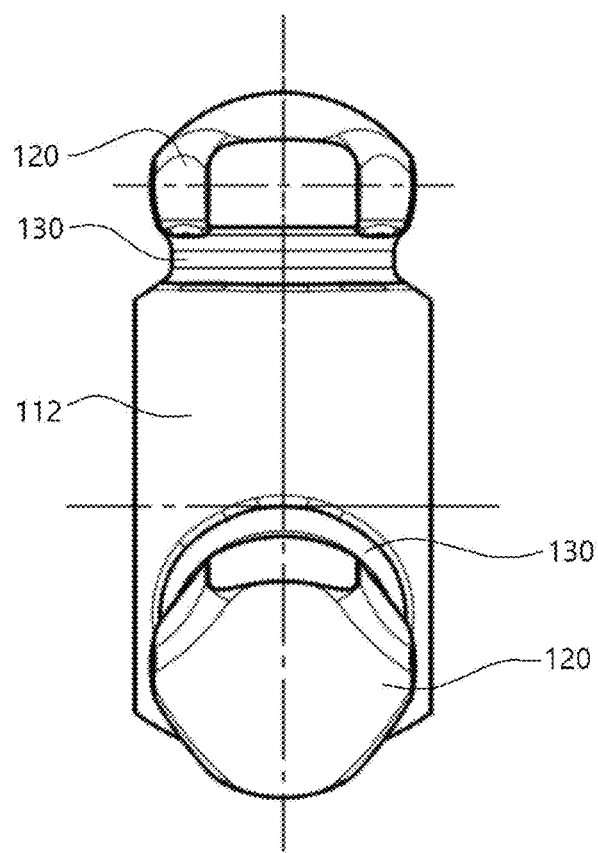
FIG. 5 is a side diagram showing one side surface of the trunnion shown in FIG. 3.

As shown in FIGS. 1 and 2, a constant velocity joint 10 includes a housing 1 connected with a driving shaft 3 connected to an engine and having a track 2 formed therein, as is known. A constant velocity joint 10 also includes a trunnion 110 accommodated in the housing 1 to be reciprocally transferred and a roller assembly 200 rotatably inserted into a journal unit 120 of the trunnion 110.

The trunnion 110 includes a hub unit 112 having a driven shaft 4 inserted into and coupled to an inner center hole 111, three journal units 120 protruding from an outer circumferential surface of the hub unit 112 at regular angles, and a connection unit 130 provided between the hub unit 112 and the journal unit 120. However, the number of journal units 120 is not limited thereto, and the present embodiment is described based on three journal units 120.

The trunnion 110 uses S50C to S55C carbon steels for machine structure as basic materials and can implement Rockwell hardness C (HRC) 58 to 63 through heat treatment. A detailed method for manufacturing the trunnion is described hereinafter.

The roller assembly 200 is an assembly coupled to the journal unit 120 and includes an outer roller 210, an inner roller 220 disposed in the outer roller 210, a needle bearing 211 interposed between the outer roller 210 and the inner roller 220, and retainer rings 212 disposed on both ends of the needle bearing 211 on the upper and lower surfaces of the outer roller 220.

Three roller assemblies 200 are provided corresponding to each journal unit 120, and each roller assembly 200 is disposed on the track 2 formed in the housing 1. The roller assembly 200 disposed on the track 2 can conduct a sliding motion along the track 2 while conducting a rolling motion. The center hole 111 of the trunnion 110 is coupled to the driven shaft 4. Therefore, when the driving shaft 3 rotates, power is delivered to the outer roller 210, the needle bearing 211, the inner roller 220, and the trunnion 110 in order and therefore, the driven shaft 4 is be rotated.

When the driven shaft 4 is bent with respect to the driving shaft 3, the roller assembly 200 moves along the track 2 depending upon the bending angle. Therefore, a summed length of the driving shaft 3 and the driven shaft 4 increases or decreases.

As described above, adjusting a power delivery distance (i e, summed length of the driving shaft and the driven shaft) while the roller assembly 200 moves is referred to as plunging.

To bend the driven shaft 4 with respect to the driving shaft 3 as much as possible, the roller assembly 200 and the trunnion 110 should be located adjacent to an opened portion of the housing 1. In this case, the roller assembly 200 and the trunnion 110 maintains their locations and should be prevented from being separated from the housing 1. To this end, a fixing ring (not shown) can be provided in the housing 1 to serve as a kind of a latching step.

Further, when the driven shaft 4 is bent with respect to the driving shaft 3 as much as possible, the trunnion 110 is disposed to be slightly tilted in the housing 1. To prevent the trunnion 110 from contacting the housing 1 in the tilted state, it is necessary to provide the connection unit 130 with a small diameter between the hub unit of the trunnion 110 and the journal unit 120. Therefore, it is possible to prevent the interference between the trunnion 110 and the roller assembly 200 through the connection unit 130 and at the same time, to implement a higher bending angle.

Further, the trunnion 110 is subjected to heat treatment to prevent the journal unit 120, the outer circumferential surface of the connection unit 130, and the roller assembly 200 from being deformed or damaged in the plunging process.

Figure 6:
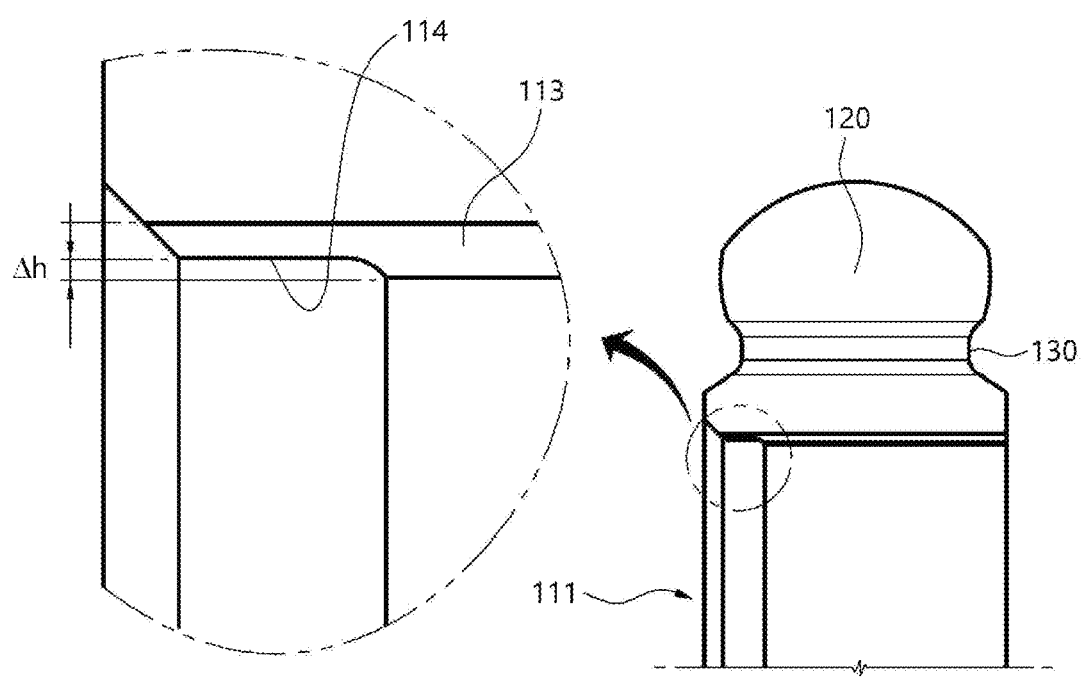
FIG. 6 is a partially enlarged cross-sectional diagram showing the inside of the trunnion shown in FIG. 5.

The center hole 111 of the hub unit 112 of the trunnion 110 is provided with a spline 113 engaged with the driven shaft 4. A plurality of splines 113 are disposed on the inner circumferential surface of the center hole 111 at regular angles or regular intervals. As shown in FIG. 6, an inlet side to which the driven shaft 4 is coupled can be provided with a guidance region 114 having a partially low height of the spline 113. The guidance region 114 can improve the ease of the coupling through a height difference ($\Delta h$) when the spline formed on the outer circumferential surface of the driven shaft 4 is coupled to the spline 113 of the trunnion 110.

Hereinafter, the aforementioned heat treatment method of the trunnion is described in detail. Hereinafter, reference numerals that are the same as the aforementioned reference numerals indicate the same components (see FIGS. 1-6).

Figure 7:
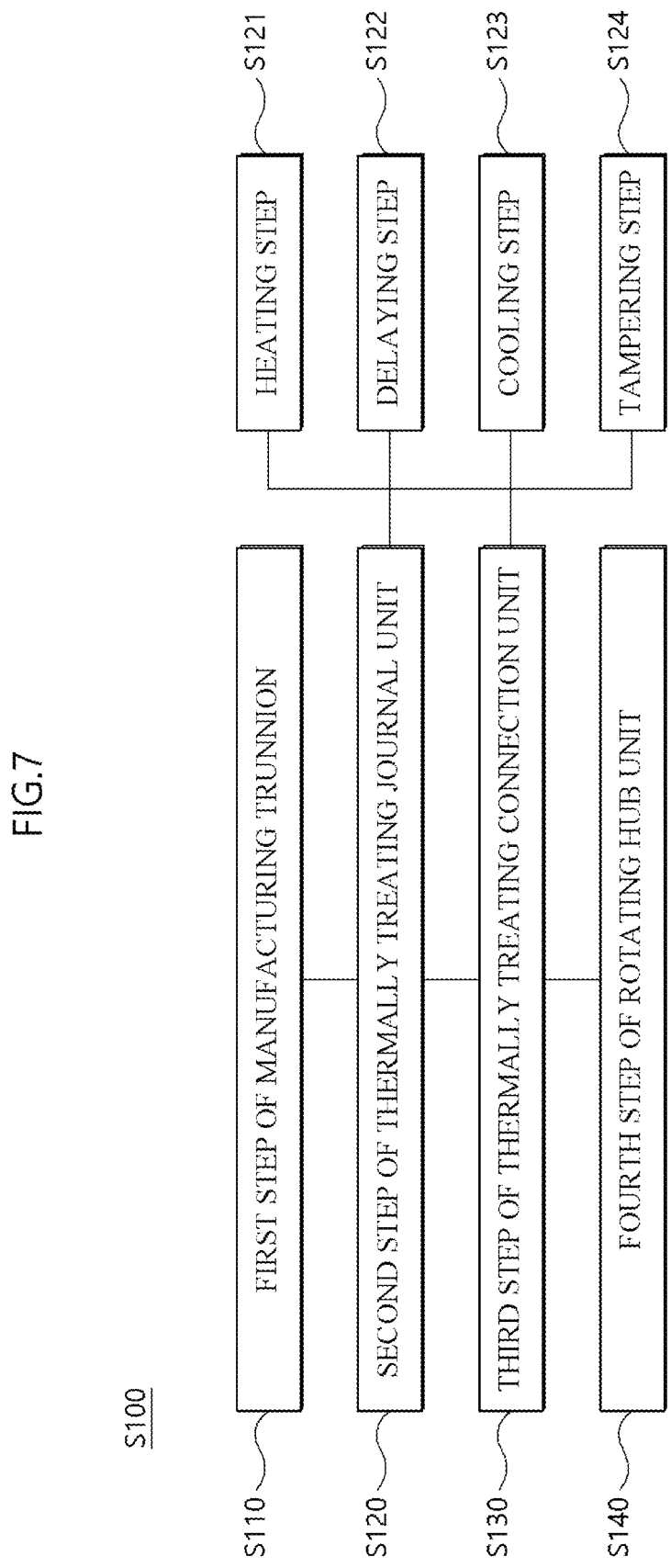
FIG. 7 is a flowchart showing a method for manufacturing the trunnion for the constant velocity joint according to the present disclosure.

Referring to FIG. 7, a method for manufacturing the trunnion for the constant velocity joint according to the present disclosure (S100) includes a first step (S110) to a fourth step (S140).

First, the first step (S110) is a step of manufacturing the trunnion. The trunnion is made of a medium carbon steel (S50C to S55C) containing carbon from 0.2 to 0.5 wt % based on the total weight. The trunnion includes carbon (C): 0.47 to 0.58 wt %, silicon (Si): 0.15 to 0.35 wt %, manganese (Mn): 0.60 to 0.90 wt %, phosphorus (P): 0.030 wt % or less (more than 0), and sulfur (S): 0.035 wt % or less (more than 0) based on the total weight.

This is relatively excellent in hardness and reduces the cost compared to the conventional method for manufacturing the trunnion through the forging processing using the low-carbon steel, and then improving the hardness through the carburized heat treatment process.

The first step (S110) can additionally add at least one of Mn, chromium (Cr), nickel (Ni), molybdenum (Mo), and boron (B) alloy elements based on the total weight of the trunnion in some cases to improve hardenability.

Next, the second step (S120) is a step of thermally treating the outer circumferential surface of the journal unit.

Further, the third step (S130) is a step of thermally treating the connection unit between the journal unit and the hub unit. The second step (S120) and the third step (S130) have only a difference in the locations of the portions to be heated and have the same heat treatment process and therefore, are described together.

The second step (S120) of thermally treating the journal unit and the third step (130) of thermally treating the connection unit (hereinafter, referred to as 'heat treatment steps') thermally treat the outer surfaces of the journal unit and the connection unit except for the spline 113 of the hub unit. The heat treatment is partially performed using a high-frequency induction heating device.

In other words, the heat treatment steps (S120, S130) do not thermally treat the region of the spline 113. Heat treatment of the region of the spline 113 requires a post-treatment process be undergone due to deformation occurring in the heat treatment process and requires a pre-treatment process be undergone in response to the size to be deformed in anticipation of occurrence of deformation. By removing the heat treatment for the region of the spline 113, it is possible to omit the pre-treatment and post-treatment processes, thereby reducing the manufacturing cost and the manufacturing period (e.g., the time required to manufacture the component).

Figure 8:
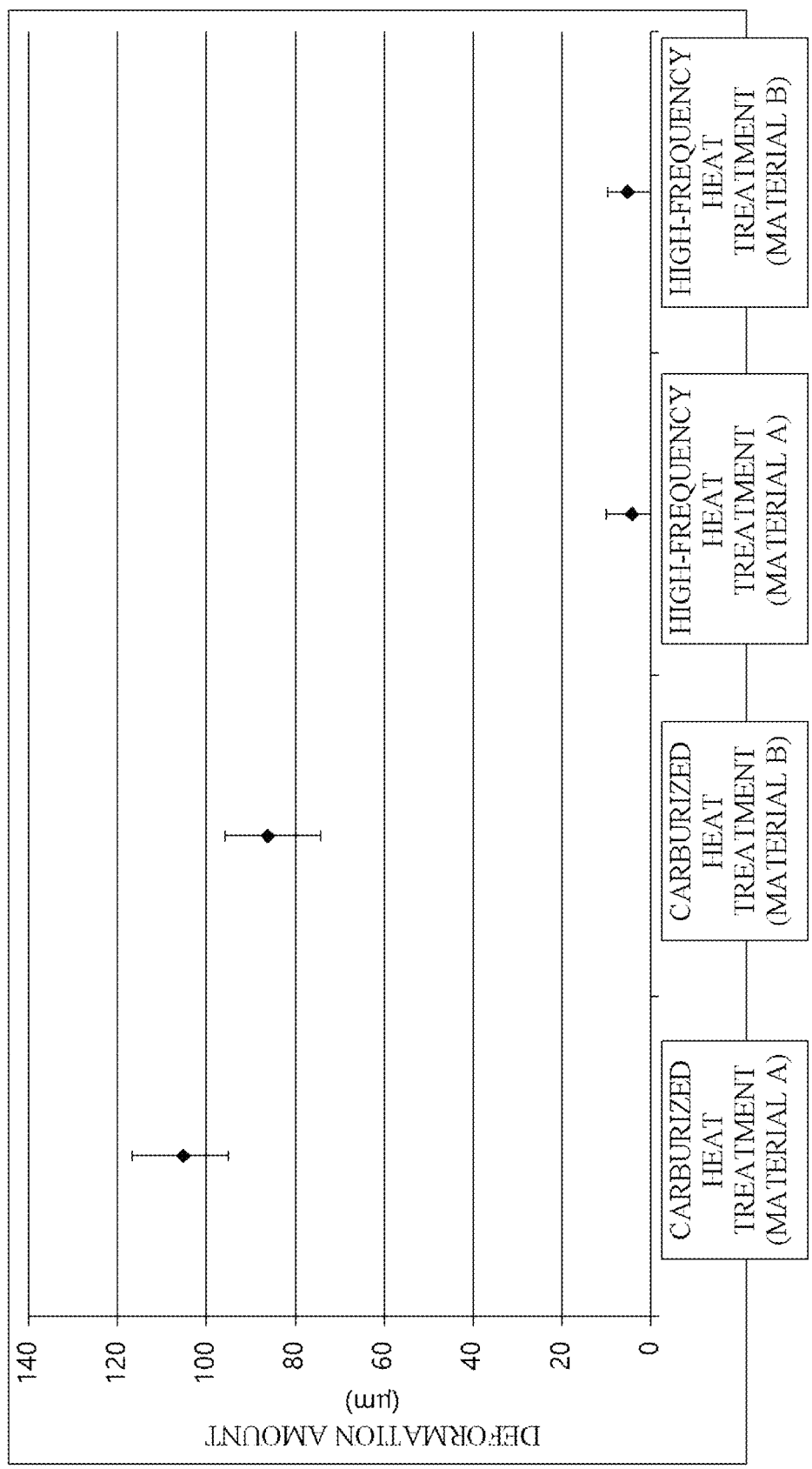
FIG. 8 is a graph showing deformation amounts in the method for manufacturing the trunnion for the constant velocity joint shown in FIG. 7 compared to the conventional heat treatment method through the carburized heat treatment.
Figure 11A:
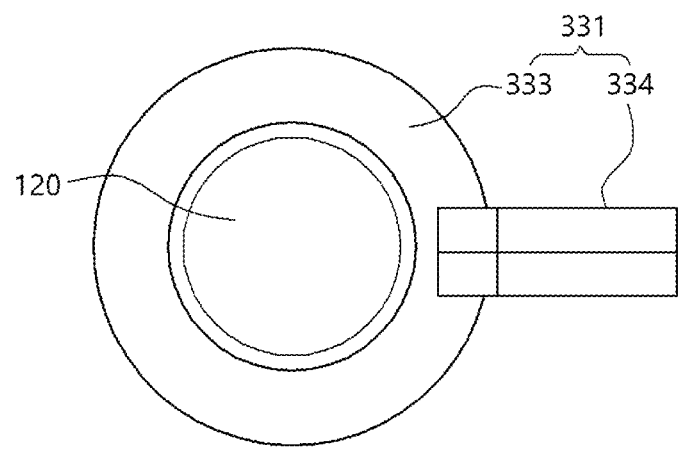
FIGS. 11A-11C are reference diagrams showing a heater according to a first embodiment of the heat treatment device of the trunnion shown in FIG. 10.
Figure 11B:
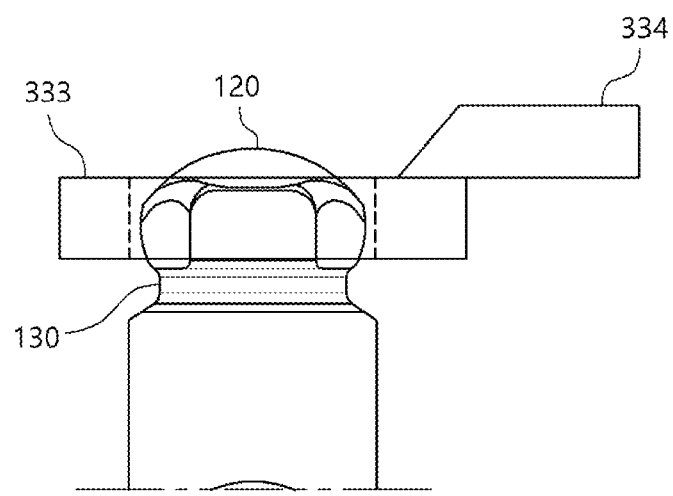
Figure 11C:
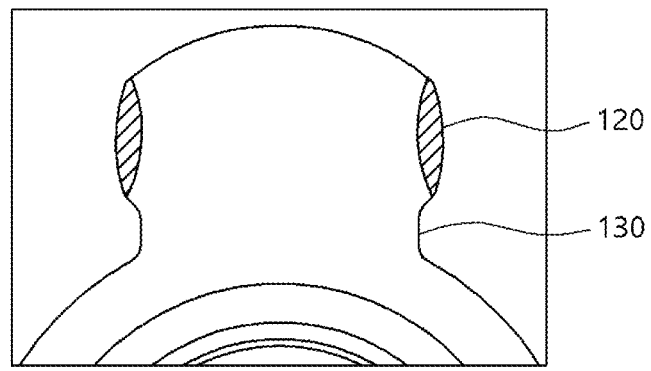

Referring to FIG. 8, it is possible to confirm a difference in deformation amounts between the carburized heat treatment and the high-frequency heat treatment.

In other words, looking at the deformation amounts of FIG. 8, a material A subjected to the carburized heat treatment exceeded about 100 micrometers (μm), and a material B subjected to the carburized heat treatment also showed the deformation amount of about 90 μm, but the material A subjected to high-frequency heat treatment showed the deformation amount of about 4 μm, and the material B subjected to high-frequency heat treatment showed the deformation amount of about 5 μm. Therefore, it can be confirmed that the deformation amount in the high-frequency heat treatment method was significantly lower compared to the carburized heat treatment. Further, since the carburized heat treatment method conducts the heat treatment by storing all of a plurality of trunnions in a hot furnace, deformation occurs at a higher rate compared to the high-frequency heat treatment method that thermally treats each trunnion partially, thereby inevitably increasing the failure rate of trunnions treated with carburized heat treatment.

The heat treatment steps (S120, S130) can conduct heat treatment up to the depth from about 5.0 to 8.0 millimeters (mm) from the outer surfaces of the journal unit and the connection unit. However, even if the heat treatment is conducted up to the maximum depth in the heat treatment step, the region of the spline 113 can be adjusted not to be thermally treated.

Referring to FIG. 9, it can be confirmed that the heat treatment method using the high-frequency induction heating device steadily maintains about Vickers hardness (HV) 500 to HV700 up to the depth of 2 mm from the surface. In contrast, the method using the carburized heat treatment has a similar hardness on the surface but as it goes the depth of 2 mm from the surface, the hardness continues to reduce up to about HV400. For example, if the minimum hardness required by the heat treatment process is about HV513, a concern is that deformation or damage can occur at a depth of about 1.2 mm from the surface in the conventional method using the carburized heat treatment.

Therefore, the heat treatment method according to the present disclosure using the high-frequency induction heating device can maintain a relatively high hardness in a depth region adjacent to the surface compared to the conventional carburized heat treatment method. The heat treatment method according to the present disclosure does not require the post-treatment process such as grinding after the carburized heat treatment either, thereby saving the manufacturing cost and the manufacturing time.

To this end, the heat treatment steps (S120, S130) according to the present disclosure includes a heating step (S121), a delaying step (S122), and a cooling step (S123).

The heating step (S121) heats the journal unit or the connection unit for about 1.5 to 2.8 seconds with the output from about 64 to 68 kilowatts (KW) by the high-frequency induction heating device.

At this time, in the heating step (S121), an input current can be 150 to 159 amperes (A), a positive voltage can be from 5.6 to 6.2 kilovolts (KV), and a positive current can be from about 4.5 to 5.0 A. If the journal unit and the connection unit are simultaneously heated in the heating step, an output may be 67.5 KW, a heating time may be 2.7 seconds, the input current may be 152.0 A, the positive voltage may be 5.9 KV, and the positive current may be 4.6 A, and if only the journal unit is heated, the output may be 64.5 KW, the heating time may be 1.6 seconds, the input current may be 158.5 A, the positive voltage may be 5.8 KV, and the positive current may be 4.8 A.

The delaying step (S122) can be a time taken to switch a mode between the heating step (S121) and the cooling step (S123) and can give a minimum natural cooling time. In some cases, the delaying step (S122) can be omitted and the cooling step (S123) can also be carried out immediately after the heating step (S121) is done.

The delaying step (S122) can solve the problem caused by rapidly switching the mode between the heating step and the cooling step by providing a time difference from about 0.05 to 0.15 seconds and may provide the delay time of 0.1 seconds.

The cooling step (S123) supplies coolant for about 4.5 to 5.5 seconds. The cooling step (S123) may supply the coolant for 5 seconds.

The heating steps (S120, S130) includes a tampering step (S124) of carrying out tampering at a temperature from 150 to 170° C. for 100 to 140 minutes. The tampering step (S124) increases hardness in the heat treatment process but makes the material soft, thereby decreasing hardness again and increasing viscosity through reheating at the above temperature or less. The tampering step (S124) may be carried out at the temperature of 160° C. for 120 minutes.

The priority of the second step (S120) and the third step (S130) can be selectively set, and if both the second step (S120) and the third step (S130) are needed, the second step (S120) and the third step (S130) can also be carried out at the same time. A structure for simultaneously carrying out the second step (S120) and the third step (S130) is described in the description of a heat treatment device of the trunnion for the constant velocity joint described hereinafter.

When the second step (S120) and the third step (S130) are done, the outer hardness of the journal unit and the connection unit can reach HRC 58 to 63.

Lastly, the fourth step (S140) is a step of rotating the trunnion on a supporter.

The trunnion is provided with three journal units around the hub unit, and in the heat treatment steps, the heat treatment of one journal unit is described as an example. Therefore, the fourth step (S140) of rotating the trunnion is carried out to thermally treat the other journal unit. A structure of the fourth step (S140) is described in the description of the heat treatment device of trunnion for the constant velocity joint described hereinafter.

Therefore, according to the method for manufacturing the trunnion for the constant velocity joint according to an embodiment of the present disclosure, it is possible to thermally treat the upper end of the journal unit or the connection unit of the journal unit adjacent to the rotating ring unit at the same time or selectively depending upon the shape of the journal unit of the trunnion. Further, it is possible to carry out the heat treatment through the high-frequency induction heating unlike the carburized heat treatment process, thereby constantly maintaining the hardness up to the setting section (depth) and also preventing the reduction in hardness or abrasion resistance due to the surface processing even if the post-treatment processing is needed. Instead of having to dispose of a large number of trunnions in the chamber when failure occurs in the carburized heat treatment process, it is possible to significantly reduce the failure rate through the individual inspection or the pre-inspection for each trunnion after heat treatment through the high-frequency induction heating.

Hereinafter, the heat treatment device of the trunnion for the constant velocity joint is described in detail.

Referring to FIG. 10, the heat treatment device of the trunnion according to the present disclosure includes a transporter 310 (see FIG. 13), a supporter 320, a heater 330, and a cooler 340.

The transporter 310 constitutes, for example, a robot arm that grips the trunnion 110, and separates and takes out the trunnion 110 mounted on the supporter 320 or completely subjected to heat treatment. Although not shown in the drawing, the transporter 310 can be accompanied by a location alignment function of the trunnion 110 coupled to the supporter 320 and can also sort out and take out the trunnion 110 completely subjected to heat treatment.

The supporter 320 includes a fixing member 321, a rotating means 322, and an alignment member 323.

The fixing member 321 is inserted into the center of the hub unit 112 of the trunnion 110 to serve to fix the trunnion 110. At this time, the trunnion 110 can be mounted on and from the fixing member 321 through the transporter 310. The fixing member 321 is formed in a shape corresponding to the center hole 111 of the hub unit 112.

The rotating means 322a, 322b include a first rotating member 322a and a second rotating member 322b.

The first rotating member 322a serves to rotate the other journal unit to be placed at a heating location of the heater 330 after any one journal unit 120 of the trunnion 110 mounted on the fixing member 321 is heated or cooled. If the heater 330 has a structure to heat each journal unit 120 or the connection unit 130, the first rotating member 322a can be omitted.

The second rotating member 322b serves to rotate the supporter 320 using the center of the journal unit 120 as the rotating axis in the heating process of the heater 330. In the structure to heat the journal unit 120 or the connection unit 130 by the high-frequency induction heating device even without rotating the trunnion 110, the second rotating member 322b can also be omitted. The second rotating member 322b can be operated because the rotation of the trunnion 110 is needed if the heating is carried out through a semi-circular heating ring to be described hereinafter.

The alignment member 323 may include an image sensor (not shown) that captures an image of the trunnion 110 from an upper direction or a side direction of the supporter 320. The alignment member 323 may determine whether the location or angle of the trunnion 110 needs to be adjusted by comparing an image captured by the image sensor with an image of the trunnion 110 mounted at the right location.

The heater 330 includes a circular heating ring 331 and a semi-circular heating ring 332.

Referring to FIGS. 10-13, the circular heating ring 331 can conduct heat treatment by heating the outer surface of the journal unit 120. The circular heating ring 331 has a structure of having a coil 333, to which a high-frequency current is applied. The heating coil 333 is wound circularly around the structure 331. The journal unit 120 to be heated is disposed within the circular heating ring 331 at a predetermined interval to generate an eddy current near the surface of the journal unit 120 to carry out heating by the loss heat.

The semi-circular heating ring 332 can heat the outer surface of the connection unit 130. The semi-circular heating ring 332 has a structure having the coil 333 to which the high-frequency current is applied wound therearound in a semi-circular shape. Since the semi-circular heating ring 332 heats only a half of the connection unit 130, for example, the aforementioned second rotating member 322b can rotate the supporter 320 to heat the entire outer circumferential surface of the connection unit 130 around the semi-circular heating ring 332. Although not shown in the drawings, the heating can be carried out even without the rotation driving of the second rotating member 322b by disposing the semi-circular heating rings 332 to face each other around the connection unit 130.

Figure 12A:
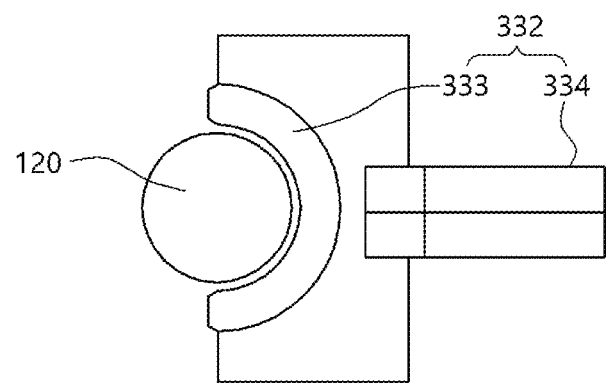
FIGS. 12A-12C are reference diagrams showing a heater according to a second embodiment of the heat treatment device of the trunnion shown in FIG. 10.
Figure 12B:
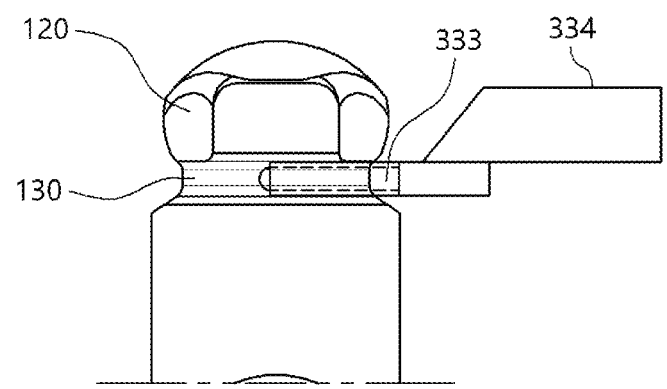
Figure 12C:
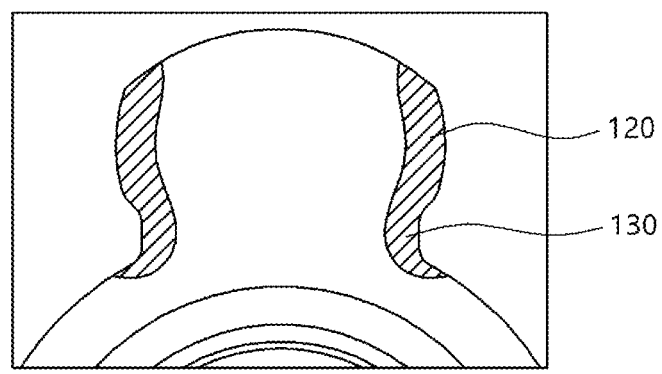

Further, the heater 330 can also be provided with a composite heating ring (not shown) in which the circular heating ring 331 and the semi-circular heating ring 332 are integrally formed. The composite heating ring can simultaneously heat the outer side surfaces of the journal unit 120 and the connection unit 130. When the heat treatment is carried out through such heating, as shown in FIG. 12C, the side surface of the journal unit 120 and the side surface of the connection unit 130 can be simultaneously subjected to heat treatment.

Further, the heater 330 is disposed such that the height of the circular heating ring 331 or the semi-circular heating ring 332 can be adjusted in the vertical direction of the journal unit 120 disposed at the heating location. In other words, in a state where the journal unit 120 or the connection unit 130 to be heated is in the right location, the circular heating ring 331 or the semi-circular heating ring 332 can move downward to stop to correspond to the heating location, and after heating is done, move upward again to move to the original location.

The heater 330 is composed of a coil part 333 and a support bar 334, in which the coil part 333 can be formed in a circular or semi-circular shape, and the support bar 334 can have a power supply line connected to the coil, and a coolant line cooling the coil part disposed therein.

The cooling part 340 includes a first cooling member 341 and a second cooling member 342.

The first cooling member 341 directly supplies coolant to the trunnion 110 to cool it. Although not shown in the drawings, the second rotating member 341 can also be driven in an operation process of the first cooling member 341. Then, the journal unit 120 or the connection unit 130 can become the center of the rotation, thereby increasing the area contacting the coolant, and also increasing the cooling speed.

The second cooling member 342 supplies coolant that circulates in the heater 330. Since the heater 330 is a device using an induction heating method, it does not directly provide heat, but cooling is required due to a rapid increase in temperature of the object to be heated.

Therefore, according to the heat treatment device of the trunnion for the constant velocity joint according to an embodiment of the present disclosure, it is possible to significantly reduce the failure rate compared to the conventional carburized heat treatment method. Additionally, it is possible to reduce the pre-treatment process due to deformation because the spline located on the inner diameter of the trunnion is not subjected to heat treatment, thereby decreasing the manufacturing cost.

As described above, although the present disclosure has been described with reference to the embodiments shown in the drawings. The described embodiments are only for explaining the disclosure. It should be understood by those having ordinary skill in the art to which the present disclosure pertains that various modifications or equivalent embodiments can be made from the detailed description of the disclosure.

Therefore, the true scope of the present disclosure should be determined by the technical spirit of the claims.

What is claimed is:

1. A method for manufacturing a trunnion for a constant velocity joint, the trunnion having a plurality of journal units provided on the outside thereof around a hub unit, the method comprising:
a first step of manufacturing the trunnion;
a second step of thermally treating a rounded outer circumferential surface of the journal unit; and
a third step of thermally treating a connection unit disposed between the journal unit and the hub unit and having a diameter smaller than that of the journal unit,
wherein the second step or the third step further includes
a heating step, through a high-frequency induction heating device, of carrying out heating for 1.5 to 2.8 seconds with an output from 64 to 68 kilowatts (KW),
a delaying step of having a time difference from 0.05 to 0.15 seconds, and
a cooling step of carrying out cooling for 4.5 to 5.5 seconds, and
wherein, in the second step or the third step, an input current is from 150 to 159 amperes (A), a positive voltage is from 5.6 to 6.2 kilovolts (KV), and a positive current is from 4.5 to 5.0 A.

2. The method of claim 1,
wherein the second step or the third step carries out heat treatment up to a depth from 5.0 to 8.0 millimeters (mm) from outer surfaces of the journal unit and the connection unit except for a region of a spline provided on an inner circumferential surface of the hub unit.

3. The method of claim 2,
wherein the region subjected to heat treatment through the second step or the third step maintains Vickers hardness (HV) of HV560 or more up to the depth of at least 2 mm from the outer surfaces of the journal unit and the connection unit.

4. The method of claim 1,
wherein the second step or the third step further comprises:
a tampering step of carrying out tampering at a temperature from 150 to 170° C. for 100 to 140 minutes.

5. The method of claim 1,
Wherein, when the second step and the third step are done, the outer hardness of the journal unit and the connection unit are formed from Rockwell hardness C (HRC) of HRC58 to 63.

6. The method of claim 1,
wherein the first step has the trunnion made of a medium carbon steel (S50C to S55C) containing carbon of 0.2 to 0.5 wt % based on the total weight, and
the trunnion comprises: carbon (C): 0.47 to 0.58 wt %, silicon (Si): 0.15 to 0.35 wt %, manganese (Mn): 0.60 to 0.90 wt %, phosphorus (P): 0.030 wt % or less (more than 0), and sulfur (S): 0.035 wt % or less (more than 0).

7. The method of claim 6,
wherein the first step adds at least one of Mn, chromium (Cr), nickel (Ni), molybdenum (Mo), and boron (B) alloy elements to the trunnion.

8. The method of claim 1, further comprising:
a fourth step of rotating the hub unit at a set angle to thermally treat the other journal unit when the heat treatment (the second step or the third step) for one journal unit is done.

9. A trunnion manufactured by the method for manufacturing a constant velocity joint of claim 1.

* * * * *